United States Patent [19]

Christian

[11] 4,297,208
[45] Oct. 27, 1981

[54] INCLINED HELICAL FLIGHT CONVEYOR

[75] Inventor: Robert F. Christian, San Francisco, Calif.

[73] Assignee: Jude Engineering, Inc., San Francisco, Calif.

[21] Appl. No.: 207,204

[22] Filed: Nov. 14, 1980

[51] Int. Cl.³ .............................................. B01D 21/06
[52] U.S. Cl. ..................................... 210/94; 210/523; 209/464; 100/117
[58] Field of Search ................ 209/464, 463; 210/523, 210/95, 414, 415, 94; 100/117, 145, 147–150; 198/676, 661

[56] References Cited

U.S. PATENT DOCUMENTS

| 492,262 | 2/1893 | Beaty | 209/464 |
| 689,871 | 12/1901 | Gray | 210/95 X |
| 2,233,707 | 3/1941 | Nelson | 198/676 X |
| 2,933,187 | 4/1960 | Old et al. | 209/464 |
| 3,648,826 | 3/1972 | Brooks | 198/676 X |
| 3,753,399 | 8/1973 | Dessoris | 100/145 |

FOREIGN PATENT DOCUMENTS

| 2620628 | 3/1977 | Fed. Rep. of Germany | 100/117 |
| 13901 | of 1908 | United Kingdom | 209/464 |

Primary Examiner—Ralph J. Hill
Attorney, Agent, or Firm—Murray and Whisenhunt

[57] ABSTRACT

An inclined helical conveyer has a container containing a rotary shaft carrying a helical flight which has openings cut out of the flight adjacent the shaft serving to separate liquid from particulate material as the latter is conveyed up the conveyer.

8 Claims, 5 Drawing Figures

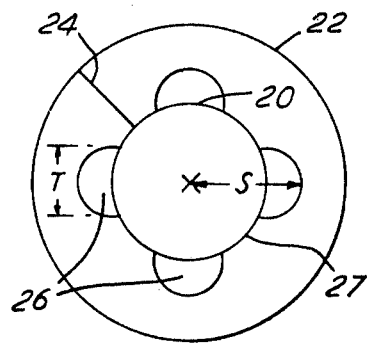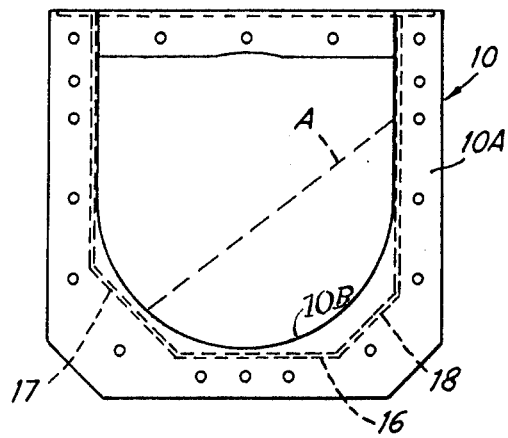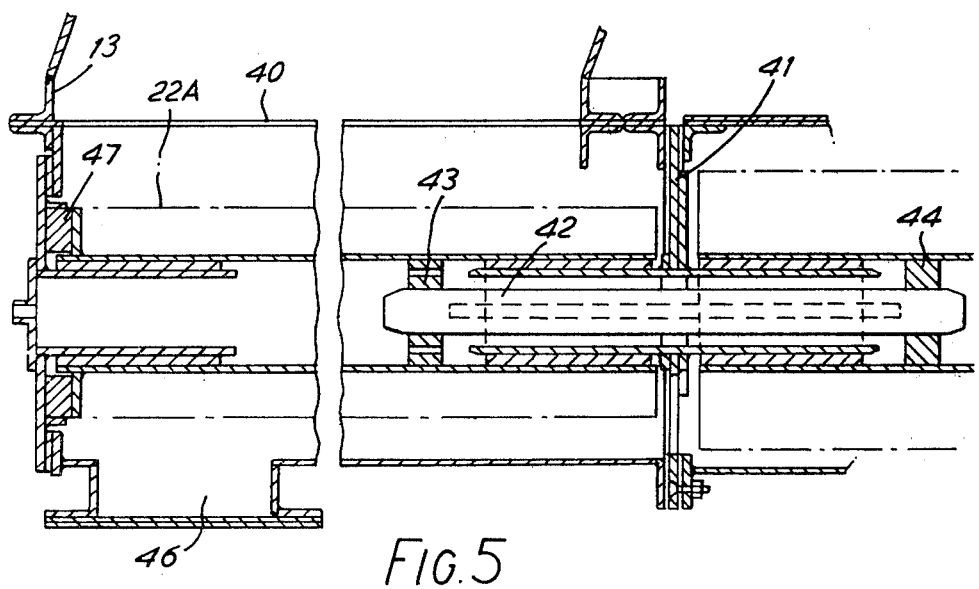

INCLINED HELICAL FLIGHT CONVEYOR

This invention relates to inclined helical flight conveyers and its main object is to provide a conveyer capable of separating liquid from a mixture of liquid and particulate material as the latter is conveyed up the conveyer. The material may for example be activated carbon which is washed with water which then must be separated from the carbon. Another use is for removing liquid from guar bean waste.

According to the invention the conveyer comprises a container having an inlet for mixture at one end, an outlet for liquid at the same end, and an outlet for particulate material at the other end, a shaft rotatably in the casing coaxially therewith, a helical flight fixed to the shaft between the shaft and the casing, said flight being made from a series of circular rings cut radially and pressed to helical shape, each ring being welded to the shaft at a plurality of arcs on the inner edge of the ring, said ring having openings cut therein between the arcs, the diameter of the shaft being 0.3 to 0.55 of the outer diameter of the ring, the radius of the openings from the centre of the ring being 1.2 to 1.6 times the radius of the shaft, said rings being unconnected with the shaft at said openings.

The width of the openings tangentially to the shaft is preferably from 0.45 to 0.75 of said radius of the openings.

The flight is preferably of progressively greater pitch towards the material outlet end so that the conveying efficiency progressively decreases which facilitates transfer of material from side to side of the container thereby providing particle relocation and back flow of liquid.

The container may be in the form of a trough part of which may be closed by a cover plate.

In use the container is supported at an inclination of 5°-35° to the horizontal with the material outlet at the upper end.

The container also preferably has a bottom shape at one side spaced from the flight a greater distance than at other positions to accept a body of material which assists in draining of liquid.

The invention will be further described by way of example with reference to the accompanying drawings wherein:-

FIG. 3 is a view of one of the rings from which the flight of the conveyer is made; and FIG. 4 is an end view thereof.

FIG. 5 is a partial crossectional view of the lower end of the conveyer of FIG. 1.

Figure 1:
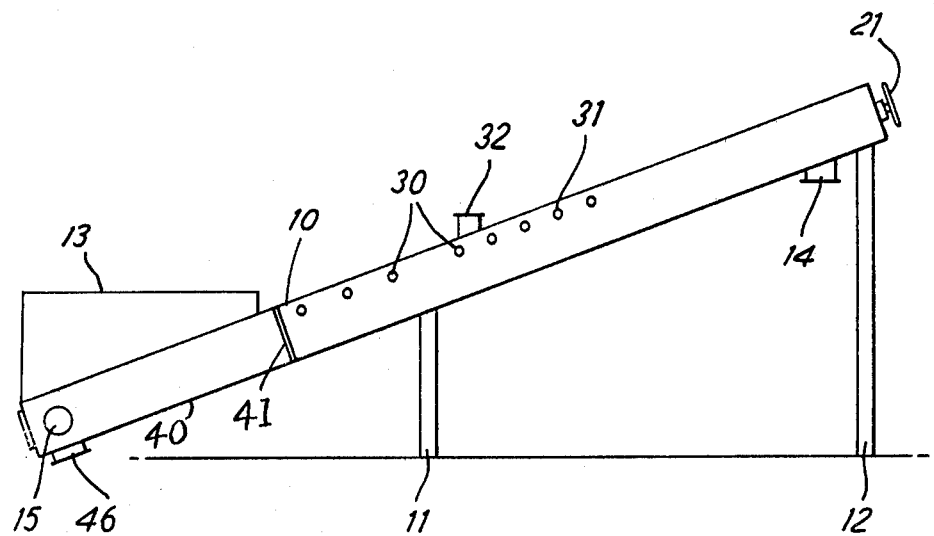
FIG. 1 is a side view of a conveyer made in accordance with the invention.
Figure 2:
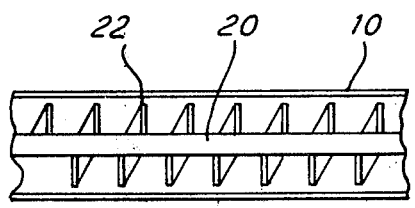
FIG. 2 is a part sectional view thereof.

The conveyer consists of a trough shaped container 10 mounted at an angle of about 5° to 35° e.g. 20° to the horizontal on columns 11, 12. The casing has an inlet hopper 13 at its lower end and a discharge opening 14 at its upper end for the particulate material. The casing also has a discharge opening 15 for liquid at its lower end.

Within the cases is a rotary shaft 20 mounted on suitable bearings and driven at 21 from any suitable source of power. Welded to the outside of the shaft 20 is a helical flight 22. The flight is made from flat steel plate cut into rings one of which is shown in FIG. 3. The ring is cut radially at 24 and a central hole is cut to fit the shaft 20. Also four openings 26 are cut equiangularly spaced apart to leave arcuate portions 27. The ring is deformed in a press to helical shape. The portions 27 are welded to the shaft leaving the openings 26 through which water can flow back down the casing to the outlet.

The openings must be large enough but not too large and the maximum radial dimension of the openings largely determines the water level in the casing. The size of shaft and openings can be defined as follows:

(a) the shaft diameter is from 0.3 to 0.55 of the outer diameter of the ring, (b) the radius of the openings S is 1.2 to 1.6 times the radius of the shaft, (c) preferably the width T of the openings tangentially to the shaft is from 0.45 to 0.75 of said radius S.

Fitted to the casing at various levels spaced along the casing are a number of water level indicators 30. According to the readings of these indicators the water level can be adjusted by the speed of rotation of the shaft which is generally about 0.5 to 4 r.p.m. A little higher up the container there are high level water warning devices 31 and an emergency overflow outlet 32.

In addition to single screw conveyers the invention includes the use of intermeshed plural helical flights in a common casing.

The bottom of the casing 10 is formed with a flat part 16, and two corner parts 17, 18. The path of the outer edge of the helical flight is about the same as the edge 10B (FIG. 4) of the end plate 10A of the casing 10. The part 18 is spaced from the flight a greater distance than at other parts so that a bed 19 of material under treatment is provided at one bottom corner of the casing which improves the efficiency of draining of the liquid from the particulate material. In use the mixture being treated lies at an angle about as indicated by the broken line A.

In the example shown, the container is made with a separate lower portion 40 joined to the upper portion by a bulkhead 41 which has large openings therin. The shaft is in two parts joined by a splined shaft 42 engaging two other rings 43, 44. The lower portion 40 has a clean-out opening 46 and the lower end of the shaft is mounted in a bearing 47. The lower part has a separate flight 22A e.g. 12 inch diameter and 12 inch pitch. In the upper part of the container the flight may have an 8 inch pitch at the lower part followed by a part of 12 inch pitch followed by a length of 16 inch pitch at the upper upper end, the diameter in this example being 16 inches.

I claim:

1. A helical conveyer comprising a container having an inlet for mixture at one end, an outlet for liquid at the same end, and an outlet for particulate material at the other end, a shaft rotatably mounted in the casing coaxially therewith, a helical flight fixed to the shaft between the shaft and the casing, said flight comprising a series of circular rings cut radially and pressed into helical shape, each ring being welded to the shaft at a plurality of arcs on the inner edge of the ring, said ring having openings therein between the arcs, the diameter of the shaft being 0.3 to 0.55 of the outer diameter of the ring, the radius of the openings from the centre of the ring being 1.2 to 1.6 times the radius of the shaft, said rings being unconnected with the shaft at said openings.

2. A conveyer as claimed in claim 1 wherein the casing is fitted with a plurality of normal water level indicating devices spaced apart along part of its length.

3. A conveyer as claimed in claim 2 having water level warning devices and an overflow outlet further towards the material outlet than the normal water level indicating devices.

4. A conveyer as claimed in any of the preceding claims wherein the container is spaced further from the helical flight at one lower bottom side than at other positions to contain a bed of mixture under treatment.

5. A conveyer as claimed in claim 1 wherein the flight has portions of increasing pitch towards the material outlet end.

6. A conveyer as claimed in claim 1 wherein the tangential width of each opening is 0.45 to 0.75 of the said radius of the openings.

7. A conveyer as claimed in claim 1 wherein the openings are four in number and their edges away from the shaft are arcs of circles.

8. A conveyer as claimed in claim 1 wherein the lower part of the container provided with the inlet for the mixture is a separate part connected with the remainder by a bulkhead having openings therein, the shaft also being in two parts connected by a splined shaft that passes through the bulkhead.

* * * * *